United States Patent [19]

Abbes et al.

[11] 4,341,406

[45] Jul. 27, 1982

[54] PIPE COUPLING COMPRISING A CHAIN COLLAR

[75] Inventors: Claude Abbes, Saint Etienne; Raymond de Villepoix, Donzere; Christian Rouaud, Bourg Saint Andeol, all of France

[73] Assignee: Commissariat a l'Energie Atomique, Paris, France

[21] Appl. No.: 205,519

[22] Filed: Sep. 30, 1980

[30] Foreign Application Priority Data

Oct. 15, 1979 [FR] France ................... 79 25563

[51] Int. Cl.³ .............................. F16L 23/00
[52] U.S. Cl. ..................... 285/408; 24/279; 285/411
[58] Field of Search .............. 285/367, 366, 365, 411, 285/410, 409, 408, 407; 24/279

[56] References Cited

U.S. PATENT DOCUMENTS

| 940,510 | 11/1909 | Carnahan et al. | 285/365 X |
| 2,697,570 | 12/1954 | Snyder | 285/367 X |
| 2,883,211 | 4/1959 | Grass | 285/367 X |
| 2,895,748 | 7/1959 | Oldham | 285/367 X |
| 3,600,770 | 8/1971 | Halling | 285/411 X |

FOREIGN PATENT DOCUMENTS

| 569547 | 1/1959 | Canada | 285/365 |
| 2404890 | 10/1974 | Fed. Rep. of Germany | 285/367 |

*Primary Examiner*—Thomas F. Callaghan
*Attorney, Agent, or Firm*—Kerkam, Stowell, Kondracki & Clarke

[57] ABSTRACT

Pipe coupling of the type comprising two end fittings which can be fixed to two parts of the circuit to be connected and an open collar constituted by a plurality of articulated elements, with which are associated tensioning means, said elements cooperating with the end fittings to bring the latter into tightly sealed contact during the utilization of the tensioning means, wherein the collar has at least one C-shaped spring connecting each of the articulated elements and giving the collar a semi-rigid structure, there being a clearance in a direction longitudinal with respect to the spring between the latter and each of the articulated elements in order to prevent the transmission of the tightening forces to the spring.

4 Claims, 5 Drawing Figures

PIPE COUPLING COMPRISING A CHAIN COLLAR

BACKGROUND OF THE INVENTION

The invention relates to a pipe coupling comprising a chain collar or clamp, said coupling being positioned between two parts of a circuit to be connected, such as two pipes or a pipe and a valve.

The invention more particularly relates to a coupling of the type comprising two end fittings which can be fixed to two parts of the circuit to be connected and an open collar constituted by a plurality of articulated elements with which are associated tensioning means, said elements cooperating with the end fittings in order to bring the latter into tightly sealed contact during the utilization of tensioning means.

A known coupling of this type is shown in FIG. 1. It has two conical end fittings 10 fixed to the ends of pipes, for example for welding, and a chain collar 20 constituted by a plurality of elements or links 22 articulated on one another via connecting elements 24. Collar 20 is open and has a screw-nut system 36 and a not shown hook located at its two opposite ends. The collar is closed by engaging the nut of the screw-nut system on the hook. Moreover, each of the links 22 defines two inner and facing frustum-shaped surfaces which engage on outer frustum-shaped surfaces formed on the end fittings in order to bring the latter towards one another when the collar is closed and then tightened by means of the screw-nut system 36. The bringing together of end fittings 10 compresses an annular gasket 19 in such a way that the sealing of the circuit is ensured.

Couplings of this type have numerous advantages compared with other known connection systems. Thus, these couplings are generally much less cumbersome than conventional couplings with bolted flanges for identical pipe diameters. Moreover, the fittings and tightening of the coupling can be carried out much more rapidly and easily than with traditional couplings. In addition, the tightening force can be significantly reduced by carefully choosing the inclination angle of the conical surfaces formed on the end fittings and on the collar links. In addition, when the coupling is used for connecting two apparatuses in a circuit, the distance separating said apparatuses can be very small, because the collar tensioning means are located in the plane of the latter, perpendicular to the pipe axis, whereas the bolts of conventional bolted flange couplings have to be introduced axially. Finally, the collar can be replaced or reused on other identical end fittings and there is no need for there to be any positioning before the welding of the end fittings onto the pipes.

Despite the numerous advantages of couplings with end fittings using so-called chain collars, this type of coupling is not used when fitting and removal have to be carried out remotely, for example by means of a manipulator. This is particularly the case when the two parts of the circuit to be connected are positioned behind a tightly sealed wall only permitting a limited radial access.

The failure to use such couplings under these special conditions is due to the fact that the fitting of the collar onto the end fittings necessitates at least two operations. These operations consist on the one hand of holding one of the ends of the collar and on the other of winding the collar around the end fittings so as to bring the two collar ends into the vicinity of one another in order to permit the closing and tightening of the collar by tensioning means. This problem is increased when the cross-section of the pipes to be connected increases. Thus, due to the clearances necessarily existing at the articulations between the different links of the collar, the fitting of the latter can be difficult when the collar is of a considerable length and in fact certain of the collar elements can be positioned obliquely on the end fittings.

BRIEF SUMMARY OF THE INVENTION

The invention relates to a construction of a pipe coupling comprising two end fittings and a chain collar not having the disadvantages of the known couplings of this type and which can in particular be fitted and removed remotely, for example by means of a manipulator when the two parts of the circuit to be connected are placed behind a tightly sealed wall only permitting radial access. The coupling according to the invention is not however limited to this special application and its ease of fitting means that it can be used with advantage, even when there is no problem with access to the circuit.

Thus, the invention proposes a coupling of the type defined hereinbefore wherein the collar has at least one C-shaped spring, connecting each of the articulated elements and giving the collar a semi-rigid structure, there being a clearance in the longitudinal direction relative to the spring between the latter and each of the articulated elements.

As a result of the spring connecting the elements constituting the coupling collar according to the invention, the removal and refitting operations can be performed successively by means of a manipulator, particularly when the circuit carries radioactive substances preventing any manual handling. Thus, the manipulator can be used to completely loosen or release the collar, move aside the end fittings, for example for replacing a defective gasket, then reposition the collar on the end fittings and tighten it to reestablish the sealing of the coupling. Due to the clearance between the articulated elements and the spring, the latter is not involved in the tensioning forces during the tightening of the collar.

In this type of coupling, the tensioning means generally comprise a threaded bolt articulated on an articulated element located at one of the ends of the collar, a clamp nut screwed to the bolt and a hook formed on the articulated element located at the other end of the collar, the hook being designed to receive an anchoring member carried by the clamp nut when the bolt pivots in the direction corresponding to the closing of the collar. According to another feature of the invention, the threaded bolt then has an abutment on which bears the clamp nut when the latter is moved away from the corresponding end of the collar, the said abutment being positioned in such a way that the spring is under tension when the collar is closed, the clamp nut bearing against the abutment.

To further facilitate the fitting and removal of the coupling, whilst making it possible to close the collar before the latter is brought level with the conical end fittings, the internal diameter of the collar preferably exceeds the external diameter of the end fittings when the collar is closed, the clamp nut bearing on the said abutment.

The invention also relates to a collar for use in a coupling of the type defined hereinbefore.

BRIEF DESCRIPTION OF THE DRAWINGS

The invention is described in greater detail hereinafter relative to non-limitative embodiments of the invention and with reference to the attached drawings, wherein show.

DETAILED DESCRIPTION OF THE PREFERRED EMBODIMENTS

Figure 5:
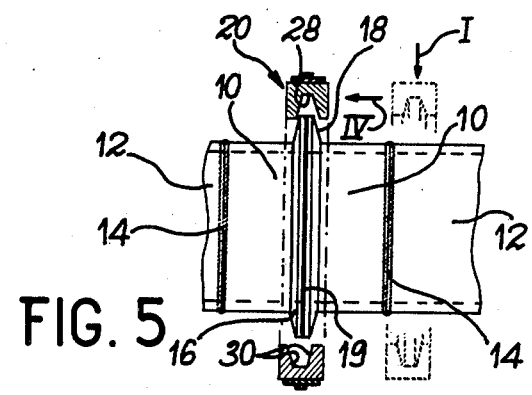
FIG. 5 a side view, partly in section, illustrating in diagrammatic manner a stage in the fitting of the coupling according to the invention.

As shown in FIG. 5, the coupling according to the invention comprises two identical end fittings 10 which can be sealingly fixed to two parts of a circuit to be connected, such as two pipes 12. The fixing of the end fittings 10 to each of the pipes 12 can be realised, for example, by means of welds 14. Each of the end fittings 10 has a flange 16, whose surface 18 opposite to the other end fitting is frustum-shaped. The facing surfaces of each of the flanges 16 receive between them a known annular gasket 19.

Figure 2:
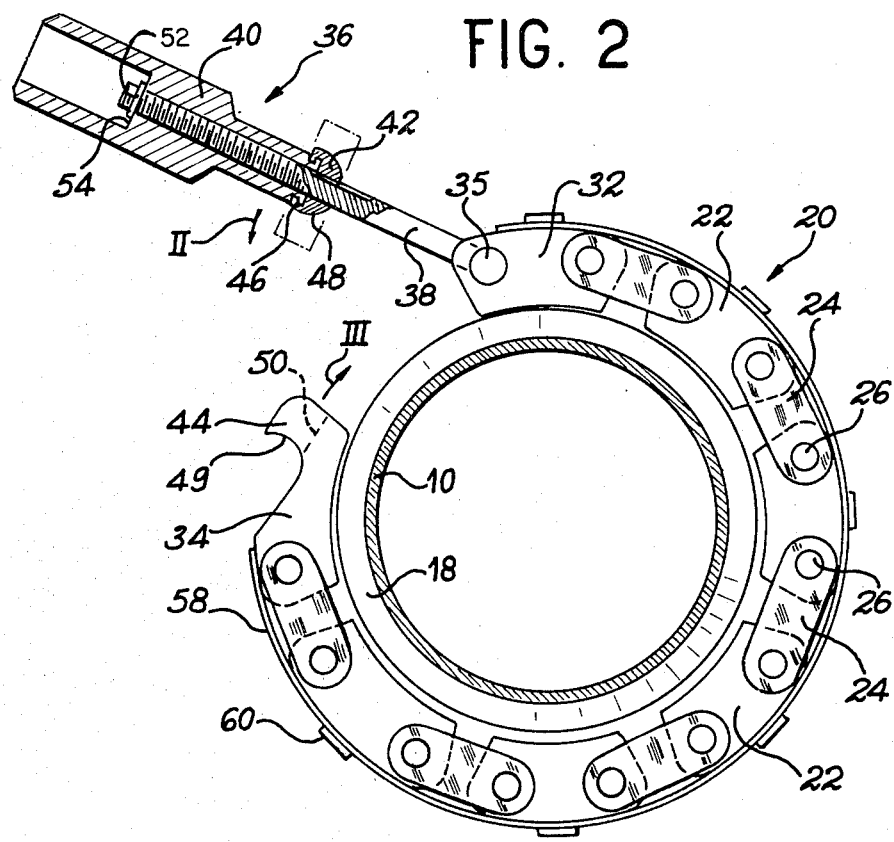
FIG. 2 a partial cross-sectional view of the coupling according to the invention, the chain collar being shown in the open position.
Figure 3:
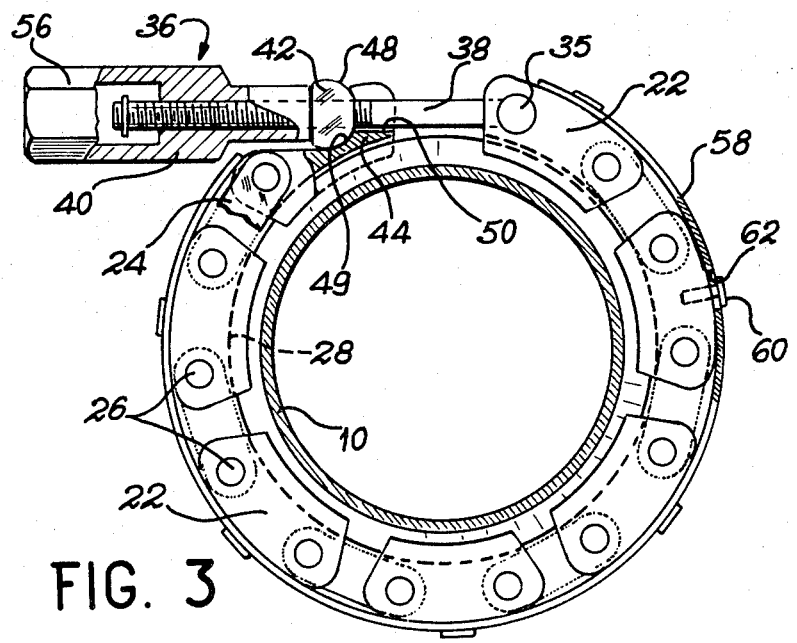
FIG. 3 a view comparable to FIG. 2 showing the coupling according to the invention after it has been tightened.

As is more particularly shown in FIGS. 2 and 3, the coupling according to the invention also comprises a chain collar 20 constituted by a plurality of elements or links 22, articulated to one another by means of connecting members 24, each of the members 24 being positioned between two consecutive links 22 and articulated to the latter by means 26. As is more particularly shown in FIG. 5, each of the links 22 has on its inner surface a recess 28 defining two facing frustum-shaped surfaces 30 complementary to the surfaces 18 formed on the flanges 16 of end fittings 10.

The links 22 and connecting members 24 are assembled so as to form an open chain, terminated at each of its ends by a link 32, 34 respectively. Link 32 is identical to the other links 22, but supports a tensioning system 36 by a pin 35. System 36 is constituted by a threaded bolt 38 fixed to pin 35 or mounted so as to pivot on the latter and by a nut 40 screwed onto the threaded bolt 38. An anchoring member 42 carried by nut 40 engages on a hook 44 formed by link 34.

More specifically, the anchoring member 42 is rendered integral in translation with nut 40 by a system of grooves 46 permitting the rotation of the nut relative to the anchoring member. On its face which is closest to the pivot pin 35, anchoring member 42 has a semi-cylindrical surface 48 complementary to a surface 49 defined by hook 44 on the outer face of link 34. A slot 50 in the median plane of link 34 traverses the end of hook 44 so as to receive the threaded bolt 38 when the anchoring member 42 is located in hook 44, as illustrated in FIG. 3.

The free end of threaded bolt 38 carries a ring 52 defining an abutment on which bears a surface 54 formed in a recess in head 56 of nut 40, when the latter is unscrewed to the maximum (FIG. 2). Finally, head 56 of nut 40 defines a gripping surface, for example a hexagonal surface in the manner illustrated in FIG. 3, by means of which nut 40 can be screwed or unscrewed by a suitable, not shown, tightening tool.

According to the invention and in order to improve the holding of collar 20 during the fitting and removal of the coupling a C-shaped spring plate 58 connects each of the articulated elements 22 of the collar. In the embodiment shown in the drawings, the spring plate 58 has a rectangular cross-section. Moreover, the plate is located at the outer periphery of links 22 and is connected to each of the latter by fixing systems, such as screws or rivets 60 received in oblong holes 62 (FIG. 3) formed in the spring plate 58 in a longitudinal direction with respect to said plate. The resulting longitudinal clearance prevents the transmission to spring plate 50 of tightening forces applied by the tensioning means 36 to collar 20 during the tightening of the coupling. However, the presence of spring 58 is not prejudicial to the tightening of the coupling and instead permits the chain collar 20 to have a semi-rigid structure and a clearly defined configuration in the inoperative position, no matter what its orientation. This semi-rigidity of collar 20 obtained by means of spring 48 enables it to easily be fitted and tightened and then removed by means of a manipulator.

The shape of collar 20 defined by spring 58 is that of a C, whose two ends must be moved together slightly, as indicated by arrow III in FIG. 2, when the tensioning system 36 pivots in the direction of arrow II about pin 35 to close the collar 20 bringing anchoring member 42 into hook 44, as illustrated in FIG. 3, nut 40 being unscrewed to the maximum, as illustrated in FIG 2. Thus, collar 20 is kept closed under the action of spring 58.

As a result of the special characteristics of the coupling according to the invention, it is easy to fit and remove collar 20, even when the coupling is relatively inaccessible, for example by means of a manipulator.

Figure 1:
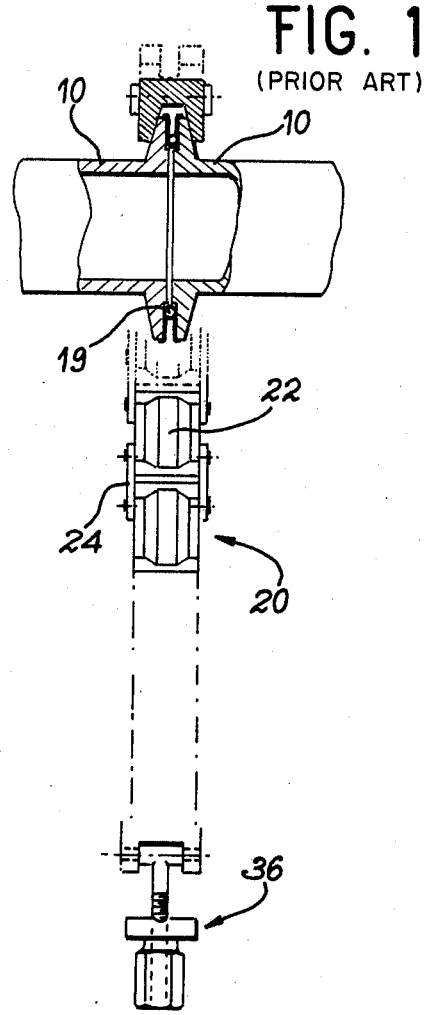
FIG. 1 a partial cross-section of a prior art coupling comprising a chain collar.
Figure 4:
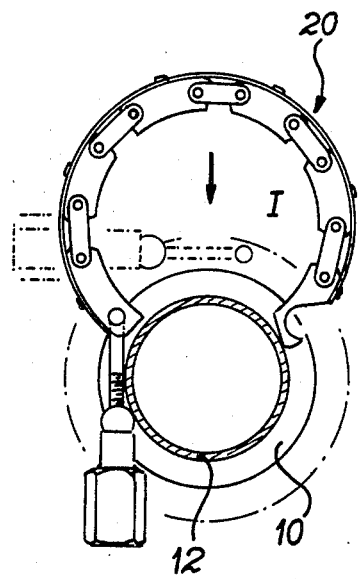
FIG. 4 a diagrammatic view illustrating the fitting of the collar on the end fittings.

In the case of a new, clean circuit, open collar 20 (cf FIG. 2) can be placed on one of the pipes in the vicinity of the end fittings, as illustrated by arrow I in FIGS. 4 and 5. It is then closed by tilting the tensioning system 36 (arrow II in FIG. 2) and by exerting a slight pressure on spring 58 (arrow III). Collar 20 is then kept closed under the action of the spring, as illustrated in FIG. 3. In this position, when surface 54 of nut 40 bears against abutment 52 of threaded bolt 38, the internal diameter of collar 20 slightly exceeds the external diameter of the flanges 16 formed on end fittings 10. Thus, the collar can be translated along the pipe 12 until the recesses 28 formed in links 22 face the flanges 16 of the end fittings. This displacement of collar 20 is diagrammatically illustrated by arrow IV in FIG. 5.

The tightening of the coupling then takes place by turning nut 40 in the direction corresponding to the moving together of links 32 and 34 of the collar. During this movement, the cooperation of the frustum-shaped surface 30 formed in recesses 28 with the frustum-shaped surfaces 18 formed on flanges 16 has the effect of bringing the latter towards one another. Tightening takes place when the annular gasket 19 located between the flanges is sufficiently compressed to ensure the sealing of the circuit.

The removal of the coupling takes place just as easily by carrying out the various operations described hereinbefore when fitting the coupling in the reverse order.

When the coupling has to be removed from a contaminated or polluted circuit, carrying for example a radioactive fluid, particularly in order to replace gasket 19, there is no possibility of manual intervention. As a result of the coupling according to the invention, the removal and refitting operations can be carried out successively by means of a manipulator via nut 56. Thus, by seizing nut 56, the manipulator can loosen the collar until contact takes the place between the nut and abutment 52 (FIG. 2). The end fitting is then moved aside and the defective joint replaced, followed by the repositioning on the end fittings and finally the tightening of the collar to seal the coupling.

It can be gathered from the above description, that each of the operations necessary for fitting and removing the coupling according to the invention can be carried out by means of a single gripping system. This feature facilitates the fitting and removal of the coupling whenever a coupling of this type has to be used. It is particularly important in the case where access to the coupling is difficult and requires remote handling. This situation more particularly occurs when the coupling is located behind a tightly sealed wall in such a way that its tightening and loosening can only be carried out by means of a manipulator. As a result of the invention, it is possible to use a coupling equipped with a chain collar for connecting two parts of a circuit by using a manipulator, which has heretofore not been the case, despite the advantages provided by this type of coupling.

Obviously, the invention is not limited to the embodiments described hereinbefore and numerous variants are possible thereto. Thus, the rectangular spring plate located on the outer periphery of the collar links in the embodiment described can be replaced by any other C-shaped spring allowing a longitudinal displacement of the links relative to the spring. This spring can in particular be constituted by a locking nut received in holes formed in each of the collar links, by a spring plate having a trapezoidal cross-section received in a dovetail groove formed on the outer periphery of the collar links or by a locking nut received in eyelets formed in the screws or the like, integral with each of the links. In the same way, the shape of the links and the connecting elements is of little importance and the latter can also be positioned in the median plane of the links or on the side of the latter. Finally, the coupling can differ from that described provided that its tightening is obtained by means of a collar cooperating with end fittings in order to ensure the sealing of the coupling. Thus, the end fittings and/or collar can be straight, conical or wedge-shaped surfaces then being formed on one or more intermediate members.

What is claimed is:

1. A coupling comprising two tubular end fittings adapted to be sealingly fixed to two parts of a circuit to be connected, a collar for clamping the end fittings together, a plurality of articulated elements, connecting pieces joining said articulated elements, tensioning means for connecting end elements of said collar closing said collar and to move said end fittings one towards the other, said elements cooperating with said end fittings to bring said end fittings into tightly sealed contact when said tensioning means moves said end elements one towards the other, at least one C-shaped spring for said collar connected to each of said articulated elements providing said collar with a semi-rigid structure, and means for providing a clearance in a logitudinal direction between said spring and each of said articulated elements to allow relative movement between said spring and each of said articulated elements whereby the clearance prevents transmission of tightening forces to said spring.

2. A coupling according to claim 1, said tensioning means comprising a threaded bolt articulated to one of said end elements, a clamp nut mounted on said bolt and a hook on the other of said end elements, said hook receiving an anchoring member on said clamp nut when said bolt pivots in a direction corresponding to closing of said collar, an abutment on said threaded bolt engaging said clamp nut when said clamp nut is away from said one end element, said abutment being so positioned that said spring is under tension when said anchoring member is received in said hook.

3. A coupling according to claim 2, an internal diameter of said collar when closed and with said clamp nut bearing against said abutment being greater than an external diameter of said end fittings.

4. A chain collar comprising a plurality of articulated elements, connecting pieces joining said articulated elements to form an open collar, tensioning means for connecting end elements of said open collar in order to close said collar and to move said end elements one towards the other, at least one C-shaped spring for said collar connected to each of said articulated elements providing said collar with a semi-rigid structure, and means for forming a clearance in a longitudinal direction between said spring and each of said articulated elements to allow relative movement between said spring and each of said articulated elements whereby the clearance prevents transmission of tightening forces to said spring.

* * * * *